United States Patent
Hoffman

(10) Patent No.: US 7,874,134 B1
(45) Date of Patent: Jan. 25, 2011

(54) CONVERTING A CORN HEAD ROW UNIT FOR HARVESTING CORN STALKS IN ADDITION TO EARS

(75) Inventor: Daniel Stephen Hoffman, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/504,772

(22) Filed: Jul. 17, 2009

(51) Int. Cl.
*A01D 45/02* (2006.01)
(52) U.S. Cl. .................................................. 56/119
(58) Field of Classification Search ................ 56/119, 56/327.1, 327.2, 328.1, 14.5, 14.3, DIG. 2; 171/61, 14, 36, 42, 38
See application file for complete search history.

(56) References Cited

U.S. PATENT DOCUMENTS

| | | | |
|---|---|---|---|
| 1,901,099 A | 3/1933 | Hale | |
| 2,418,575 A * | 4/1947 | Christiansen | 171/36 |
| 2,855,058 A * | 10/1958 | Krier et al. | 171/42 |
| 3,340,935 A * | 9/1967 | Csimma | 171/14 |
| 3,420,312 A * | 1/1969 | Greedy | 171/61 |
| 3,462,928 A | 8/1969 | Schreiner et al. | |
| 3,497,013 A * | 2/1970 | Baker | 171/38 |
| 3,536,140 A * | 10/1970 | Looker | 171/61 |
| 3,587,216 A * | 6/1971 | Grether | 56/327.1 |
| 3,589,110 A | 6/1971 | Schreiner et al. | |
| 3,589,117 A * | 6/1971 | Wadsworth | 56/247 |
| 3,680,291 A * | 8/1972 | Soteropulos | 56/14.3 |
| RE27,528 E * | 11/1972 | Looker | 171/1 |
| 3,808,783 A | 5/1974 | Sutherland et al. | |
| 3,827,503 A * | 8/1974 | Hansen | 171/38 |
| 3,858,660 A * | 1/1975 | Wadsworth | 171/57 |
| 3,961,466 A | 6/1976 | Martin et al. | |
| 3,982,384 A | 9/1976 | Rohweder et al. | |
| 4,009,557 A * | 3/1977 | Reicks | 56/98 |
| 4,048,792 A | 9/1977 | Shriver et al. | |
| 4,084,396 A | 4/1978 | Fritz et al. | |
| 4,106,271 A * | 8/1978 | Carey et al. | 56/119 |
| 4,143,504 A | 3/1979 | Noack et al. | |
| 4,148,175 A | 4/1979 | Miller | |
| 4,151,700 A * | 5/1979 | Gardella | 56/13.7 |
| 4,227,366 A | 10/1980 | Pucher | |
| 4,236,369 A | 12/1980 | Decoene | |
| 4,921,050 A * | 5/1990 | Brown | 171/51 |
| 5,287,687 A * | 2/1994 | Urich et al. | 56/327.1 |
| 5,329,753 A * | 7/1994 | Arnold et al. | 56/98 |

(Continued)

FOREIGN PATENT DOCUMENTS

WO  WO 2007104097 A1 *  9/2007

*Primary Examiner*—Árpád Fábián-Kovács

(57) ABSTRACT

Each row unit of a corn head can easily be converted between a first mode, wherein only ears are harvested, and a second mode, wherein ears together with stalks are harvested. In the first mode, a pair of snapping rolls is mounted for operation beneath each row unit frame for grasping corn stalks and pulling them downwardly through a narrow throat defined by a pair of laterally adjustable deck plates mounted to a top surface of the row unit frame. In the second mode, the snapping rolls are either removed or disabled and at least one stalk cutting disk is mounted on one of a pair of gathering chain drive idler shafts, mounted at the forward end of the row unit frame, for rotating above the frame. The snapping rolls are disabled by adjusting the deck plates toward each other to close the throat.

6 Claims, 6 Drawing Sheets

U.S. PATENT DOCUMENTS

| | | | |
|---|---|---|---|
| 5,330,114 A | 7/1994 | Trenkamp et al. | |
| 5,704,202 A * | 1/1998 | Calmer | 56/106 |
| 5,878,561 A | 3/1999 | Gunn | |
| 5,911,673 A * | 6/1999 | Johnson | 56/94 |
| 5,934,054 A * | 8/1999 | Landeis | 56/14.3 |
| 6,058,690 A * | 5/2000 | Rutt et al. | 56/327.1 |
| 6,212,864 B1 * | 4/2001 | Harden et al. | 56/36 |
| 6,226,969 B1 * | 5/2001 | Becker | 56/62 |
| 6,237,314 B1 * | 5/2001 | Boll | 56/500 |
| 6,286,605 B1 * | 9/2001 | Landeis | 171/50 |
| 7,469,524 B2 | 12/2008 | Rieck et al. | |
| 2009/0025353 A1 | 1/2009 | Christensen et al. | |

* cited by examiner

CONVERTING A CORN HEAD ROW UNIT FOR HARVESTING CORN STALKS IN ADDITION TO EARS

FIELD OF THE INVENTION

The present invention relates to a row-crop combine harvester, and, more particularly, relates to a row unit arrangement for a corn head for such a harvester.

BACKGROUND OF THE INVENTION

Recently, designers have constructed row-crop combine harvesters so as to be able to collect a desired amount of crop residue (crop material other than grain) so that this residue can be used for conversion into fuel. However, during the normal process of harvesting corn, most of the stalk is left on the ground with the ears being removed from the stalk using snapping rolls and sent on into the separator and cleaning arrangements where kernels of corn are removed from the cob and other crop residue. U.S. Pat. No. 5,878,561 discloses a row crop harvester of this type. Recovering the stalk material left on the ground has required separate operations, for example, the use of a rotary cutter to sever the stalks from the ground and form a windrow, and the use of a baler to gather the stalks and form them into bales. It is also known to provide a conventional row crop harvester header with an attachment which cuts and windrows the stalks concurrently with the ears being snapped from the stalks. U.S. Pat. No. 4,148,175 discloses a device of this latter mentioned type.

In order to more efficiently gather the corn stalks, it would be desirable to collect them during the harvesting operation. While the row units of conventional combine harvesters for harvesting soy beans, milo or sunflowers are equipped with cutter arrangements for severing the stalks from the ground and with gathering devices including a grasping characteristic for grabbing the plant stalks and guiding the latter into cross-conveyors for narrowing the flow of crop to a width commensurate with that of a combine feeder house, these row units are not supplied with snapping rolls, and thus are not suitable for harvesting corn in situations where it is not desired to convey the entire stalk into the combine. U.S. Pat. No. 3,982,384 discloses a row crop harvesting header including row units designed for cutting and transporting the stalks of crops such as soybeans, milo or sunflowers into a combine for separation of the grain or seeds from the stalks and other crop residue.

Certainly it would be conceivable to construct a corn head for a combine with row units similar to those used for forage harvesters, where a cutter or cutters is provided for cutting the corn stalks from the ground, but this would require one header to be provided when it is desired to harvest only the ears and a completely separate header to be provided when it is desired to harvest stalks along with the ears, with the additional header being a substantial additional cost.

It is desired then to be able to provide a combine harvester with but a single header including row units designed for either collecting only ears from corn stalks or for collecting ears together with corn stalks during the harvesting operation.

SUMMARY OF THE INVENTION

According to the present invention, there is provided an improved combine harvester header including row units which can alternatively be used for removing the ears from corn stalks, which remain attached to the ground, or for severing corn stalks from the ground and conveying the stalks together with the ears to the separator of the combine.

An object of the invention is to provide a conventional combine harvester row unit equipped with stalk rolls and a gathering chain arrangement which cooperate for harvesting just the ears from corn stalks, and to provide optional equipment including at least a cutting arrangement adapted for being mounted to be driven together with the gathering chain arrangement in order to cut the corn stalks from the ground so that the stalks, together with the attached ears may be conveyed into the combine separator for processing.

A further object is to provide a harvester header arrangement, as stated in the foregoing object, wherein a shield arrangement is provided for covering the stalk rolls, or for covering the stalk roll drive shafts when the stalk rolls have been removed, when it is desired to harvest corn stalks along with the ears of corn.

Still another object of the invention is to provide a harvester header arrangement, as stated in one or more of the foregoing objects, wherein a gathering chain arrangement having an enhanced stalk grasping ability or characteristic is substituted for the row unit gathering chain arrangement, which may not have such a characteristic, when it is desired to harvest corn stalks.

These and other objects of the invention will become apparent from a reading of the ensuing description together with the appended drawings.

DESCRIPTION OF THE PREFERRED EMBODIMENT

Figure 1:
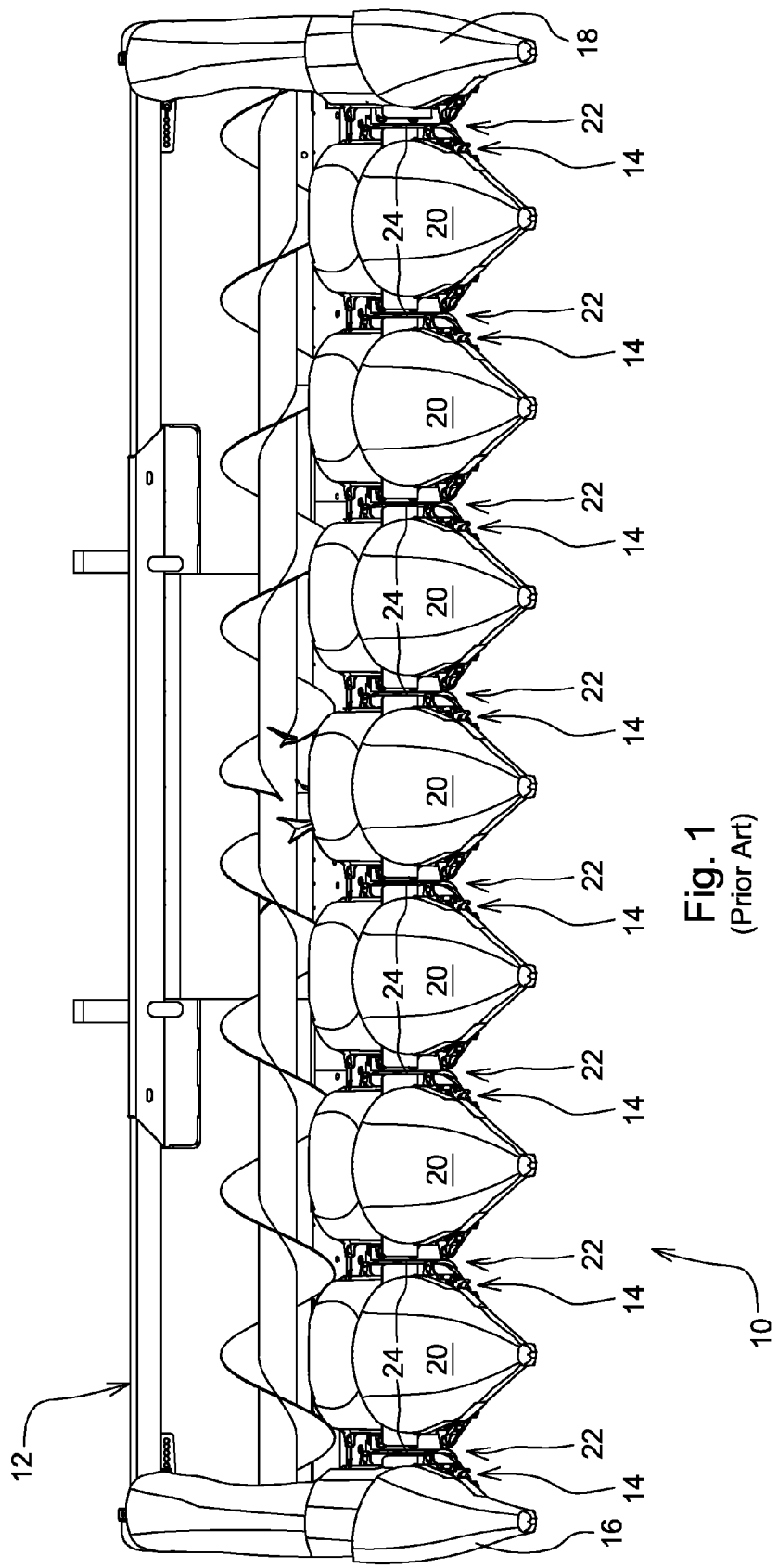
FIG. 1 is a front view of a conventional corn head for an agricultural combine, the corn head including row units which are particularly adapted for use with the present invention.

Referring now to FIG. 1, there is shown a corn head 10 including a transversely extending frame 12 across the width of which is attached a plurality of forwardly projecting row units 14 spaced in side-by-side relationship to each other a distance commensurate with that of the spacing between adjacent rows of corn to be harvested, with it being noted that it is conventional to mount the row units 14 for transverse adjustment in order to accommodate various corn row spacings. Mounted to the row units 14 and serving to separate comingled stalks of adjacent rows from one another are crop dividers including right and left dividers 16 and 18, respectively, at the opposite ends of the corn head 10, and seven identical central dividers 20, with the crop dividers defining longitudinal passages 22 between them which are centered relative to rows to be harvested and relative to a central fore-and-aft extending relatively narrow throat 24 defined by each row unit 14, as described below in further detail.

Figure 2:
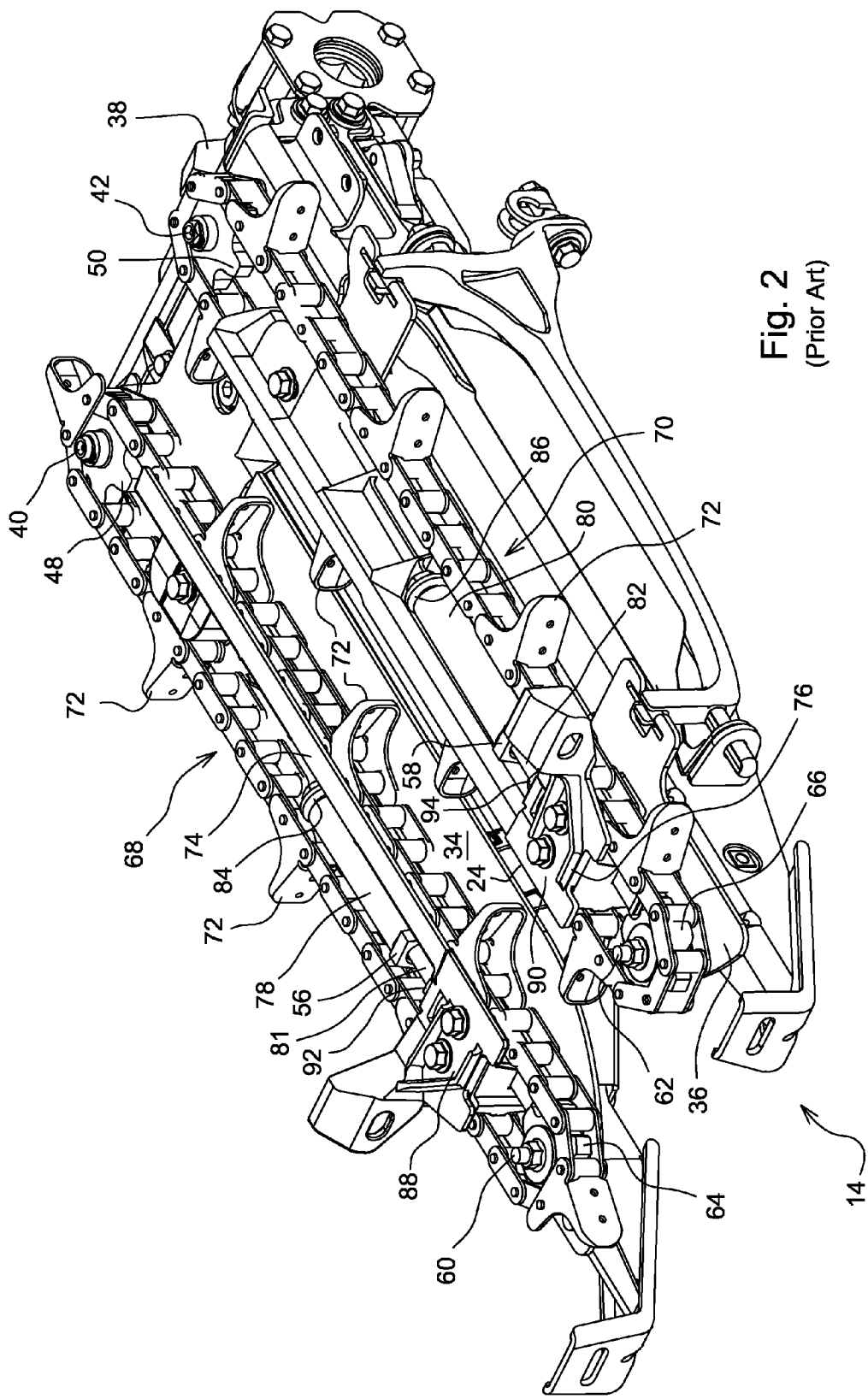
FIG. 2 is a left front perspective view of one of the row units.
Figure 3:
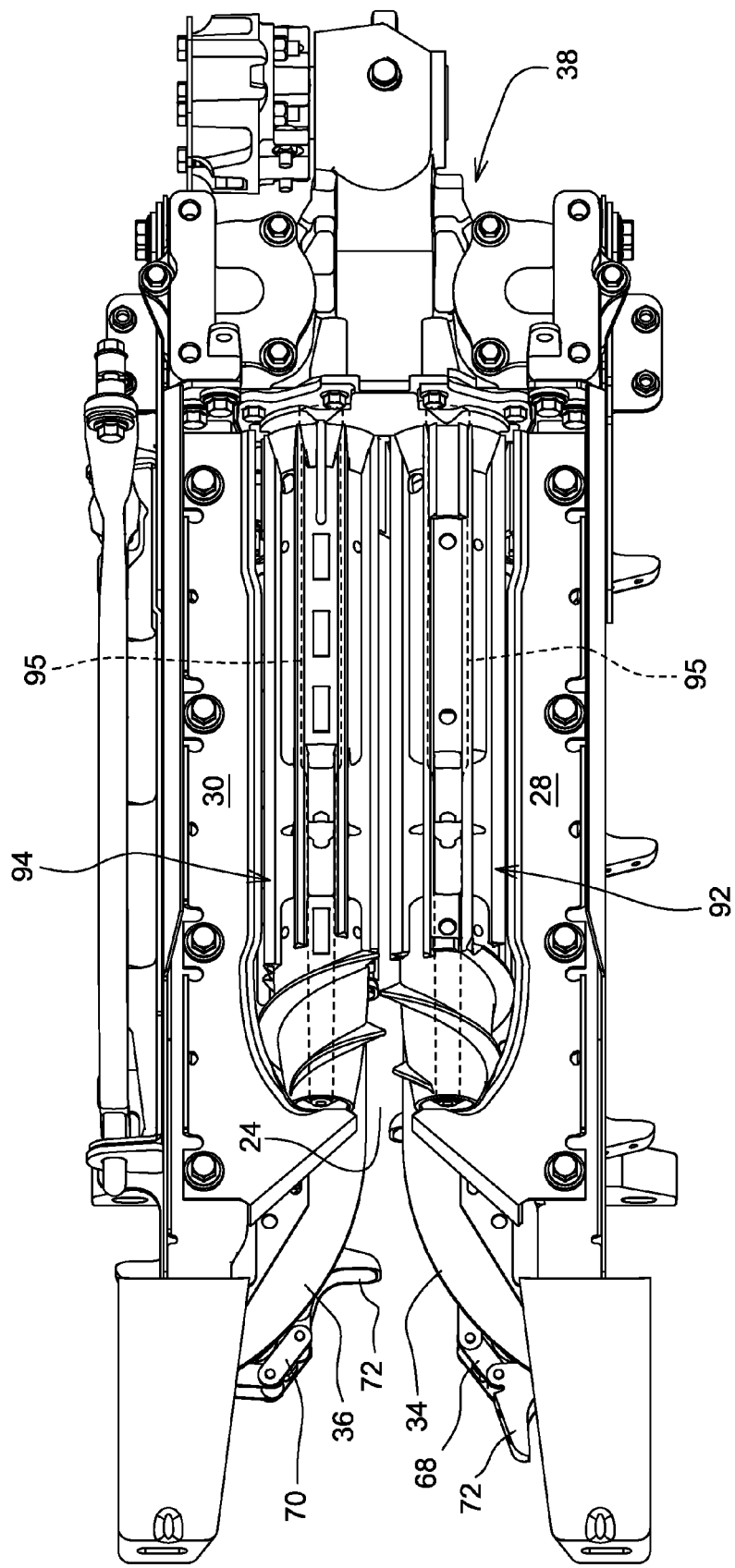
FIG. 3 is a bottom view of the row unit shown in FIG. 2.
Figure 4:
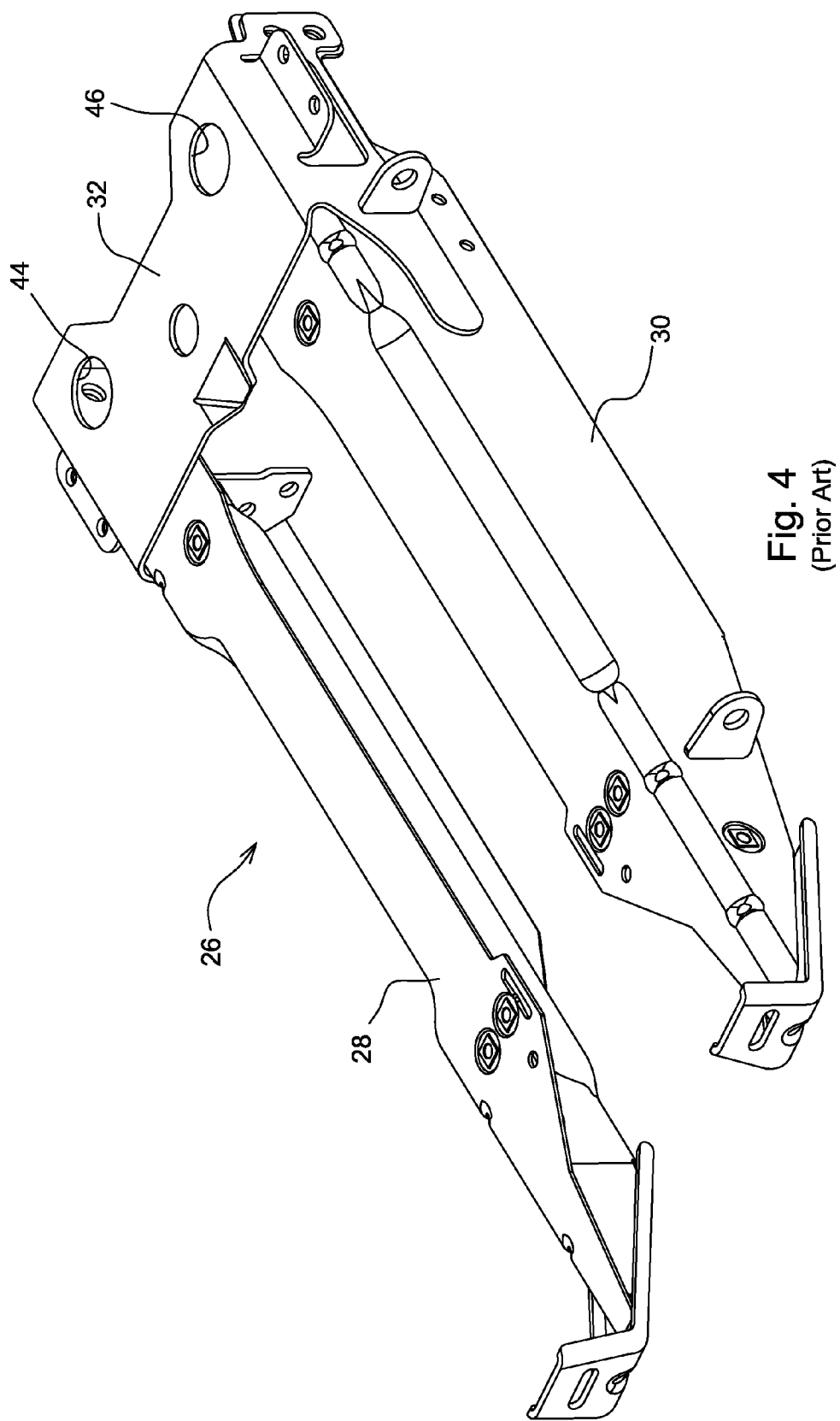
FIG. 4 is a left front perspective view of the row unit frame shown in FIG. 2.

Referring now to FIGS. 2-4, it can be seen that each row unit 14 includes a U-shaped row unit frame 26 (FIG. 4) including right and left, fore-and-aft extending legs 28 and 30, respectively, having rear ends joined by a bight portion 32. As can best be seen in FIG. 2, right and left planar deck plates 34 and 36 are respectively secured to the planar top surfaces of the frame legs 28 and 30, with the plates 34 and 36 having parallel opposed inner edges spaced apart so as to define the aforementioned narrow throat 24 which is adapted for receiving corn stalks of an aligned row as the row unit 14 proceeds along the row. The deck plates 34 and 36 may contain laterally elongated openings (not shown) receiving fasteners so that the deck plates may be adjusted laterally so that the throat 24 is closed for a purpose explained below.

Mounted beneath the bight portion 32 of the row unit frame 26 is a gear box 38 containing a pair of bevel gears (not shown) having parallel, upwardly projecting right and left gathering chain drive shafts 40 and 42, respectively, mounted therein and projecting upwardly through circular openings 44 and 46 provided in the bight portion 32. Right and left drive sprockets 48 and 50 are respectively mounted to upper end regions of the drive shafts 40 and 42. Located at forward regions of the frame leg 28 and 30 are right and left chain tensioning assemblies respectively comprising flat slide bars 52 and 54 (see FIG. 6) having up turned rear ends 56 and 58. Mounted for rotation in forward ends of the bars 52 and 54 are right and left idler shafts 60 and 62, and respectively mounted on the shafts 50 and 52 are idler sprockets 64 and 66. Forming an endless loop about the right set of drive and idler sprockets 46 and 64 is a right gathering chain 68, while a similar left gathering chain 70 is looped about the left set of drive and idler sprockets 50 and 66. The gathering chains 68 and 70 each include a plurality of outwardly projecting lugs 72 spaced along the length of the chains, with the lugs 72 at inner runs of the chains 68 and 70 projecting into the associated throat 24 so as to engage stalks of plants located there during harvesting operation. It is noted that the slide bars 52 and 54 are respectively guided for fore-and-aft movement by elongate structures 74 and 76 that are located within the loops defined by the chains and serve as chain guides to prevent the opposed inner runs of the chains from deflecting outwardly relative to the throat 24. The chain tensioning assemblies further include right and left coil compression springs (not shown) located within cylindrical housings 78 and 80, and together with the housings being carried on right and left guide rods 81 and 82. The guide rods 81 and 82 are in the form of bolts and are respectively inserted forwardly through first eyes 84 and 86 fixed to the deck plates 34 and 36, with forward ends of the guide rods being respectively inserted through openings provided in brackets 88 and 90 that are respectively fixed to forward end locations of the guide structures 74 and 76, with the guides being secured to the brackets 88 and 90 by sets of nuts 92 and 94. The right coil compression spring is compressed between the eye 84 and the back side of the slide bar up-turned end 56, while the left coil compression spring is compressed between the eye 86 and the back side of the slide bar up-turned end 58.

As can best be seen in FIG. 3, a pair fore-and-aft extending snapping rolls 92 and 94 are mounted to a pair of snapping roll drive shafts 95 projecting forwardly from the gear case 38 and having forward ends respectively supported from the frame arms 28 and 30, the snapping rolls thus being located beneath the deck plates 32 and 34 and being configured for drawing corn stalks down through the throat 24, defined by the deck plates 32 and 34, so as to cause the ears, which are too large to pass downwardly through the throat, to become detached from the stalks.

To this point, what has been described is conventional.

Figure 5:
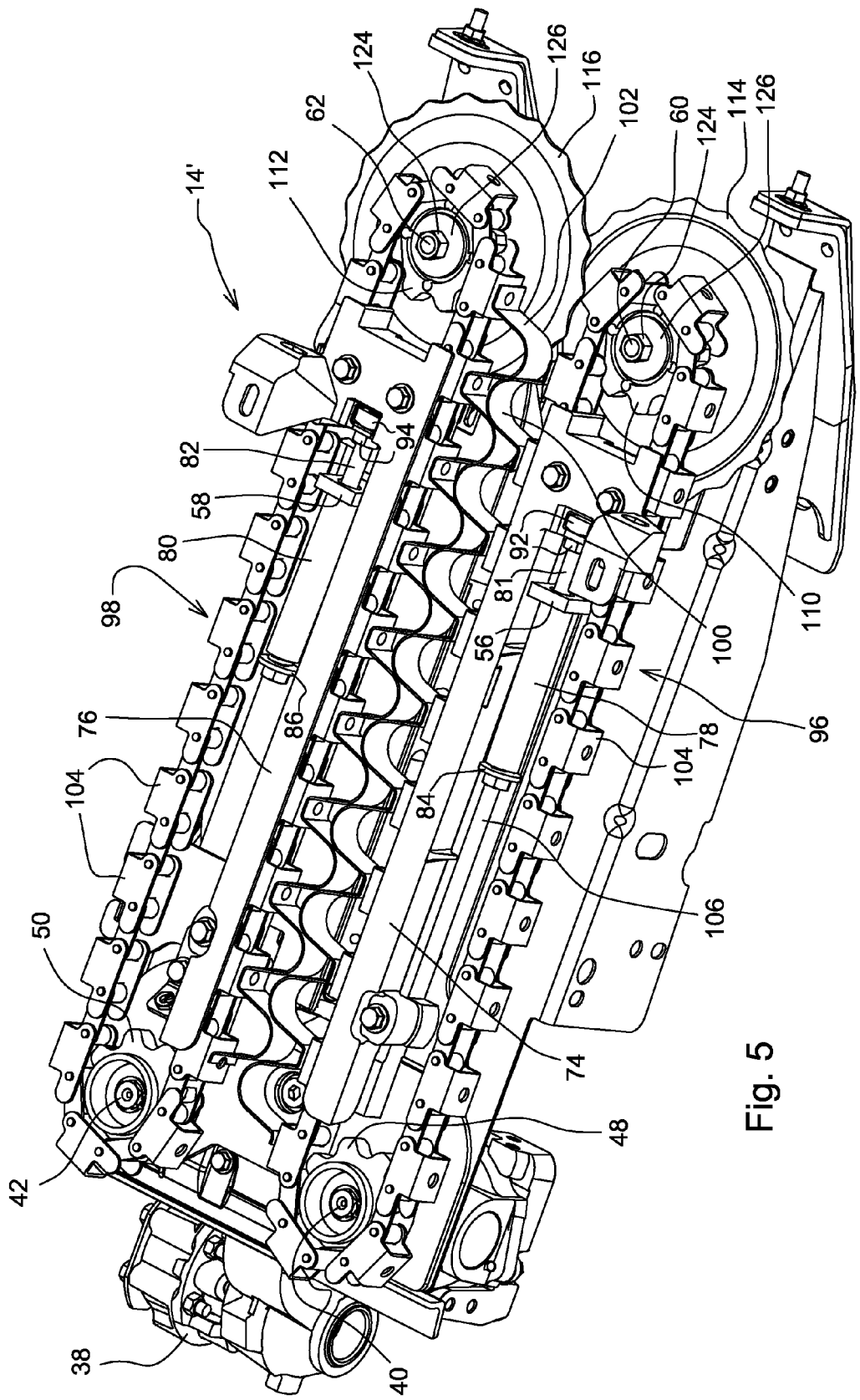
FIG. 5 is a right front perspective view of the row unit shown in FIG. 2 after it has been converted for harvesting entire stalks of corn together with the ears, but showing only the meshed, stalk-grasping sections of the belts carried by the gathering chains.
Figure 6:
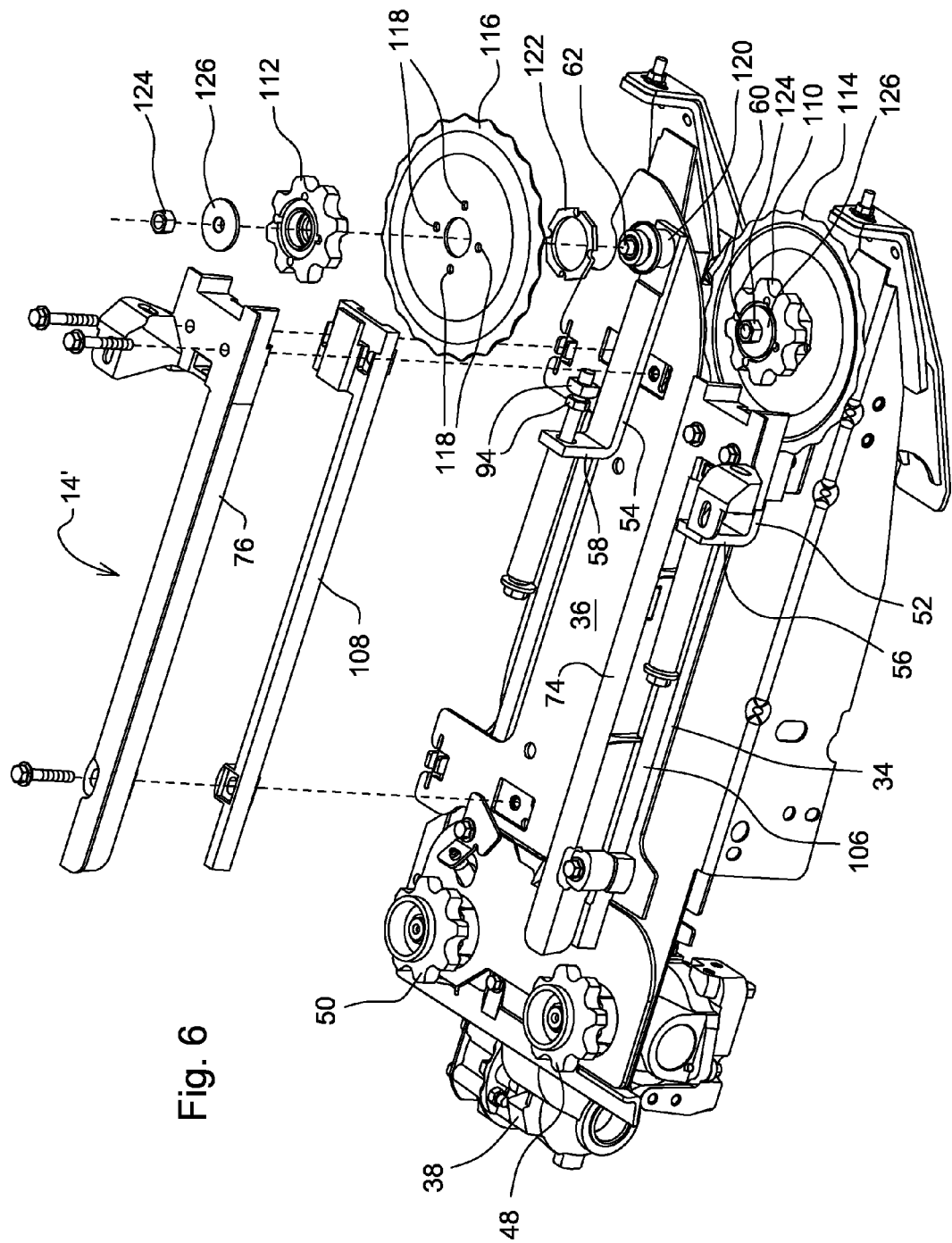
FIG. 6 is a view like that of FIG. 5, but omitting the gathering chains and showing an exploded view of the components associated with the left gathering chain, including those added for converting the row unit for harvesting entire stalks of corn.

Referring to FIGS. 5 and 6, there is shown a row unit 14' which results after converting one of the row units 14 in accordance with the principles of the present invention, with structure previously described being denoted with the same reference numerals used above. Instead of the gathering chains 58 and 60, gathering chains 96 and 98 are provided which have a stalk grasping characteristic brought about by vertically disposed flat belts 100 and 102 being attached to vertical legs of L-shaped mounting clips 104 secured to each of alternate links of the respective chains so as to define a plurality of belt loops along the chain, with the loops of one chain intermeshing with the loops of the other chain at the inner opposed runs of the chains. Because the belts 100 and 102 have a vertical height greater than that of the gathering elements 72 of the gathering chains 68 and 70 of the row unit 14, right and left elongate spacers 106 and 108, respectively, are secured beneath the elongate guide members 74 and 76 so as to provide additional clearance for permitting the belts to travel over the deck plates 34 and 36. Idler sprockets 110 and 112, respectively, are substituted for the sprockets 64 and 66 and differ from these in that each is provided with four threaded bores spaced equally about the sprocket. Right and left cutter disks 114 and 116 each contain a set of four mounting holes 118 arranged in alignment with the threaded holes in the sprockets 110 and 112, with the disks 114 and 116 being respectively connected for rotation with the sprockets 110 and 112 by bolts (not shown) inserted upwardly through the holes 118 and threaded into the sprockets. So that the sprockets 110 and 112 operate at the correct height above the deck plates 34 and 36, a cylindrical spacer 120 (only one visible) is provided on each of the idler shafts 60 and 62 at respective locations above the slide bars 52 and 54.

It is noted that the right and left cutter disks 114 and 116 are of a size and are mounted such that their respective scalloped cutting edges overlap slightly in a zone which is centered relative to a respective row of corn being harvested. Since the left cutter disk 116 passes over the top of the right cutter disk 114, a spacer ring 122 is provided between the bottom of the disk 116 and an enlarged top of the cylindrical spacer 120. The sprockets 110 and 112 and the associated cutter disks 114 and 116 are each secured in place by a nut 124 threaded onto the tops of each of the idler shafts 60 and 62 and tightened against a respective washer 126 engaged with top surfaces of the idler sprockets 110 and 112.

The operation of the row units 14 and 14' is similar in that the power for operating the row units is delivered by way of the gear housing 38 to the gathering chain drive shafts 40 and 42 supported by and projecting from the gear housing. However, although the snapping rolls 92 and 94 are likewise driven by power delivered by way of the gear housing 38, these snapping rolls are not required for the function of the row units 14' and may be disabled by removing the snapping rolls from their respective drive shafts and/or by adjusting the deck plates 34 and 36 towards each other so as to remove the throat 24, thereby shielding the snapping rolls or their drive shafts from the stalks being cut by the cutter disks 114 and 116

Thus, it will be appreciated that in order to convert the corn head 10 for harvesting the entire stalk of corn together with the corn ear, it is possible to provide a conversion kit for each row unit 14 that includes tapped idler sprockets 110 and 112, cutter disks 114 and 116, gathering chains having a stalk grasping characteristic, such as the gathering chains 96 and 98 having stalk grasping belts 100 and 102, and the various spacers 106, 108, 120 and 122.

It is, to be noted that it might be possible to replace the gathering chains 68 and 70 with gathering chains constructed so as to have a stalk grasping characteristic by using stalk grasping elements that have a height substantially equal to the gathering elements 72 in which case all but the spacer 122 may be dispensed with.

Further, instead of providing a pair of cutter disks to perform the cutting function, it is possible to provide a single star-shaped cutter disk together with an idler sprocket for driving it and to provide a fixed counter knife and attaching hardware for securing the fixed counter knife to the frame legs 28 and 30 so as to span the space between the legs. The aforementioned U.S. Pat. No. 3,982,384 discloses such a cutter disk and knife, but differs from the instant application in that the cutter disk operates below the deck plate instead of above it as is necessary to accomplish the convertible aspect of the present invention.

Having described the preferred embodiment, it will become apparent that various modifications can be made without departing from the scope of the invention as defined in the accompanying claims.

The invention claimed is:

1. A corn head for a harvesting machine adapted to advance over a field of corn planted in rows, comprising: a transversely elongated main frame; a plurality of transversely spaced row units including row unit frames extending forwardly from the main frame, each row unit having a drive arrangement including a pair of fore-and-aft extending, parallel snapping roll drive shafts configured to drive a pair of fore-and-aft extending snapping rolls, and a pair of upright, parallel gathering chain drive shafts, a pair of idler shafts being respectively mounted to a pair of chain tensioner arrangements respectively supported at upper forward regions of the row unit frame respectively in fore-and-aft alignment with said pair of gathering chain drive shafts, a pair of drive sprockets being respectively mounted on said pair of gathering chain drive shafts and a pair of idler sprockets being respectively mounted on said pair of idler shafts, and a pair of endless gathering chains being respectively looped one about each of the fore-and-aft aligned drive and idler sprockets and including gathering elements spaced along said chains, the improvement comprising: each row unit including at least one cutting disk being removably mounted beneath the idler sprocket on a first one of said pair of idler shafts for tracing a path passing above said row unit frame for cutting corn stalks so that corn stalks together with ears of corn are harvested, whereby said at least one cutting disk may be removed from said first one of said pair of idler shafts and a pair of snapping rolls may be respectively mounted on said pair of snapping roll drive shafts when it is desired to harvest only ears of corn.

2. The corn head, as defined in claim 1, and further including a pair of fore-and-aft extending snapping rolls being respectively mounted to said pair of snapping roll drive shafts, whereby said at least one cutting disk and any other cutting disk may be removed from said pair of idler shafts so that only ears of corn may be harvested.

3. The corn head, as defined in claim 1, wherein a second of cutting disk is removably mounted beneath the idler sprocket on a second of said pair of idler shafts at a second location above said row unit frame, whereby said at least one and second cutting disks cooperate with each other to cut corn stalks when it is desired to harvest corn stalks along with ears of corn.

4. The corn head, as defined in claim 2, and further including a shield arrangement mounted to each said row unit frame in covering relationship to said pair of snapping rolls for preventing stalks from being engaged by the snapping rolls, whereby corn stalks along with ears of corn may be harvested.

5. The corn head, as defined in claim 2, wherein said gathering elements of said pair of gathering chains have a stalk-grasping characteristic for aiding in the harvesting of corn stalks along with ears of corn.

6. The corn head, as defined in claim 4, wherein said shield arrangement comprises first and second deck plates mounted to a top surface of each said row unit frame for adjustment toward and away from each other between a first position, wherein a stalk receiving throat is defined between them, and a second position, wherein said throat is closed; and said deck plates being in said second position when it is desired to shield the snapping rolls from corn stalks so that the stalks along with ears may be harvested.

* * * * *